US008065381B2

(12) United States Patent
Srinivasan et al.

(10) Patent No.: US 8,065,381 B2
(45) Date of Patent: Nov. 22, 2011

(54) SYNCHRONIZING FOR DIRECTORY CHANGES PERFORMED WHILE OFFLINE

(75) Inventors: Sriram Srinivasan, Kirkland, WA (US); Thomas Ewan Jolly, Redmond, WA (US); David Matthew Kruse, Kirkland, WA (US); Brian Scott Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 12/019,810

(22) Filed: Jan. 25, 2008

(65) Prior Publication Data

US 2009/0193107 A1 Jul. 30, 2009

(51) Int. Cl.
*G06F 15/16* (2006.01)
(52) U.S. Cl. ........ 709/213; 709/216; 709/217; 709/218; 709/248
(58) Field of Classification Search .................. 709/231, 709/248, 213, 216, 217, 218
See application file for complete search history.

(56) References Cited

U.S. PATENT DOCUMENTS

| | | | |
|---|---|---|---|
| 5,799,321 A | 8/1998 | Benson | |
| 6,256,634 B1 * | 7/2001 | Moshaiov et al. | 707/100 |
| 7,290,019 B2 | 10/2007 | Bjorner et al. | |
| 2003/0105654 A1 | 6/2003 | MacLeod et al. | |
| 2004/0172421 A1 * | 9/2004 | Saito et al. | 707/200 |
| 2005/0050054 A1 | 3/2005 | Clark et al. | |
| 2005/0091226 A1 | 4/2005 | Lin et al. | |
| 2005/0273654 A1 * | 12/2005 | Chen et al. | 714/13 |
| 2006/0155776 A1 | 7/2006 | Aust | |
| 2006/0253501 A1 | 11/2006 | Langan et al. | |
| 2007/0055703 A1 | 3/2007 | Zimran et al. | |
| 2007/0204057 A1 * | 8/2007 | Shaver et al. | 709/231 |
| 2008/0082551 A1 * | 4/2008 | Farber et al. | 707/10 |
| 2008/0168183 A1 * | 7/2008 | Marcy et al. | 709/248 |

OTHER PUBLICATIONS

"Active Directory Changelog (v.2) Connector", IBM Corporation, 2007, pp. 1-6.
"Reanimating Active Directory Tombstone Objects", 2007, Microsoft Corporation, pp. 1-11.
Stettler, "Online and Offline Operation of J2EE Enterprise Applications", Nov. 5, 2003, pp. 115.
"Windows Vista I/O technologies", retrieved at <<http://en.wikipedia.org/wiki/Offline_files>>, pp. 5, Dec. 14, 2007.

* cited by examiner

*Primary Examiner* — Djenane Bayard (57) ABSTRACT

Aspects of the subject matter described herein relate to synchronizing for directory actions performed while offline. In aspects, file system objects that reside on a remote data store are made available for offline use. While offline, a client receives an indication that a directory is to be deleted or renamed. In response, the client modifies its local copy of the directory and its descendants if any and stores one or more tombstones that include information that the client can use when synchronizing the changes made to the directory when the client is reconnected to the remote data store. When the client reconnects to the remote data store, the client synchronizes changes made while offline with the remote data store. Resolution conflict mechanisms may be used during this synchronization.

16 Claims, 11 Drawing Sheets

STEPS DURING RENAME

STEP 1: CREATE SOURCE TOMBSTONE DIRECTORY

FIG. 7

STEP 2: MERGE AND RENAME

FIG. 8 STEP 3: MOVE DIRECTORY TOMBSTONE TO CORRECT LOCATION

SYNCHRONIZING FOR DIRECTORY CHANGES PERFORMED WHILE OFFLINE

BACKGROUND

Some operating systems allow a user to designate certain files to be available for offline use. When the user is connected to a server that hosts the files, the user's machine accesses the files from the server. When the user is not connected to the server, the user's machine obtains a cached copy of the files from a data store that is local to the user's machine. Later, when the user's machine is reconnected to the server, the cached copies of the files on the user's machine are synchronized with the copies of the files stored on the server. The above mechanism works well when only files are involved but has issues when directories are involved. In particular, when directories are involved, a user is not allowed to delete or rename a cached directory while the user's machine is offline.

SUMMARY

Briefly, aspects of the subject matter described herein relate to synchronizing for directory changes performed while offline. In aspects, file system objects that reside on a remote data store are made available for offline use. While offline, a client receives an indication that a directory is to be deleted or renamed. In response, the client modifies its local copy of the directory and its descendants if any and stores one or more tombstones that include information that the client can use when synchronizing the changes made to the directory when the client is reconnected to the remote data store. When the client reconnects to the remote data store, the client synchronizes changes made while offline with the remote data store. Resolution conflict mechanisms may be used during this synchronization.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
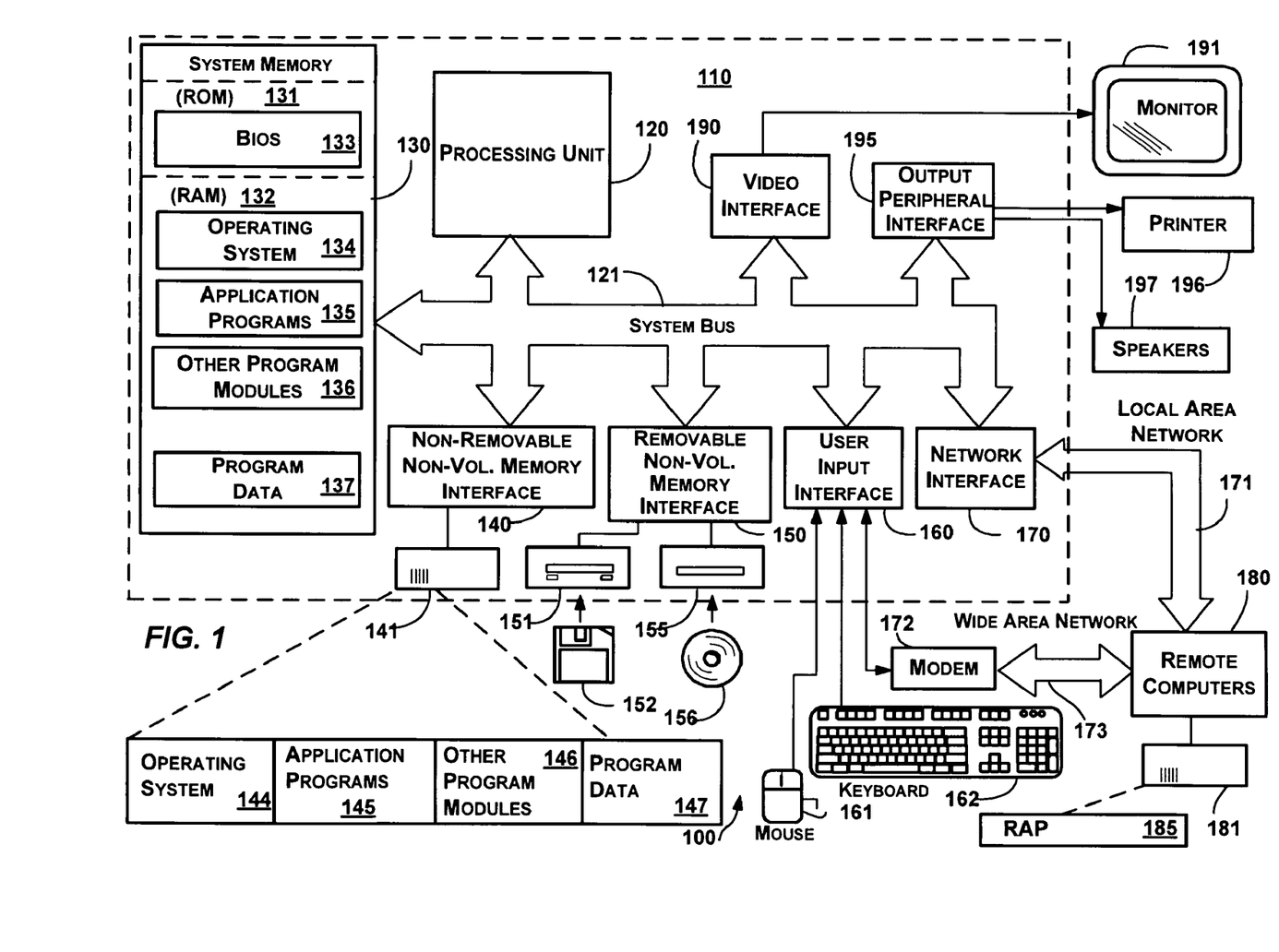
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Directory Operation

As mentioned previously, some operating systems allow a user to designate certain files to be available for offline use. When directories are designated for offline use, however, these operating systems do not allow the user to delete or rename a cached directory while the user's machine is offline (e.g., not connected to the server).

Figure 2:
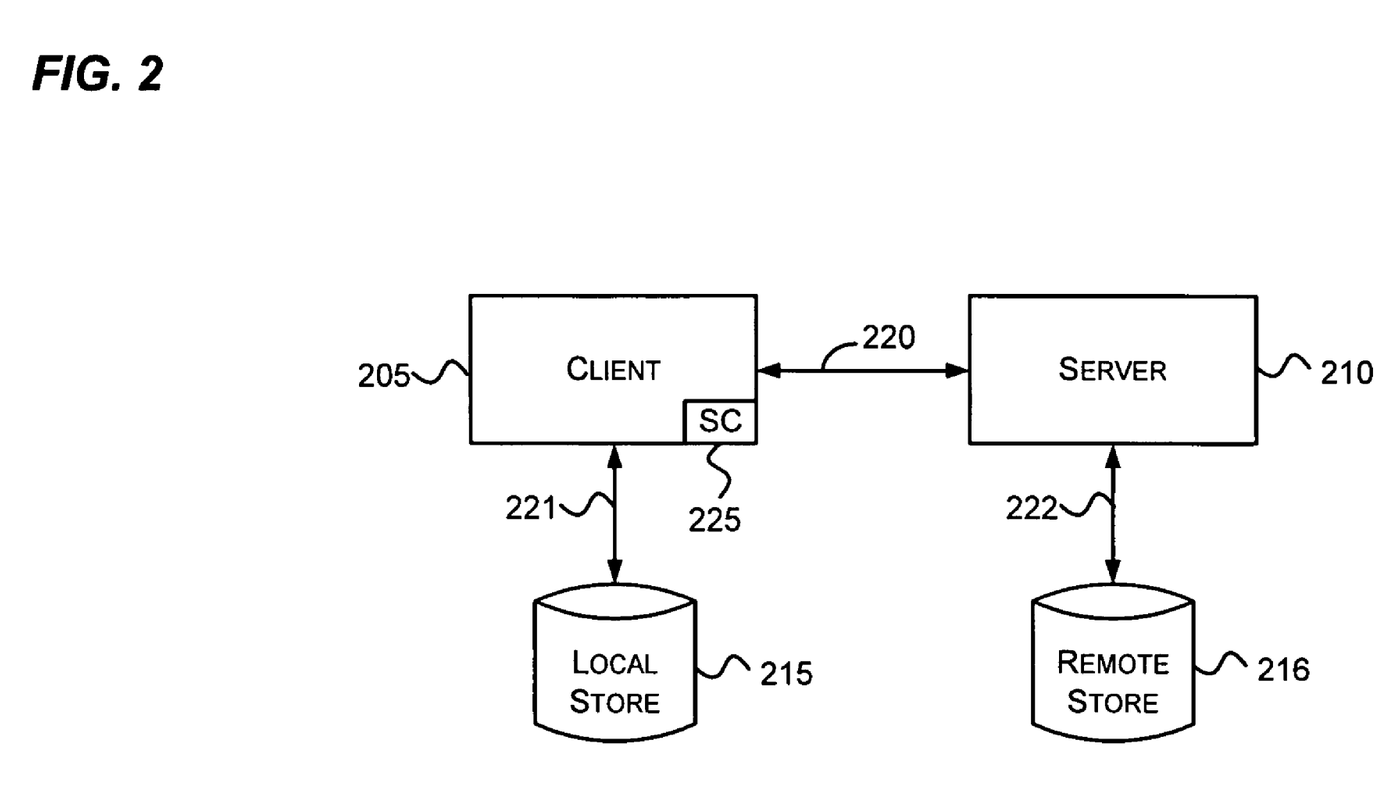
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a network 220, a client 205, and a server 210. The client 205 and the server 210 may include or be attached to data stores 215 and 216, respectively. Sometimes the client 205, the server 210, and the data stores 215-216 are referred to as entities. The environment may also include other entities (not shown).

Where a line (e.g., the lines 220-222) connects one entity to another, it is to be understood that the two entities may be connected (e.g., logically, physically, virtual, or otherwise) via any type of network including a direct connection, a local network, a non-local network, the Internet, some combination of the above, and the like.

The client 205 and the server 210 may be implemented on or as one or more computers (e.g., the computer 110 as described in conjunction with FIG. 1). Although the terms "client" and "server" are used, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, the client 205 and the server 210 may both be peers, servers, or clients. In one embodiment, the client 205 and the server 210 may be implemented on the same physical machine.

The stores 215-216 comprise any storage media capable of storing data. The term data is to be read to include information, program code, program state, program data, and the like. The stores 215-216 may comprise a file system, database, volatile memory such as RAM, other storage, some combination of the above, and the like and may be distributed across multiple devices. The stores 215-216 may be external, internal, or both external and internal to the client 205 and the server 210, respectively. Also, although the stores 215-216 are showed as being separate, in another embodiment, they may reside partially or wholly on the same device.

The client 205 may include synchronization components 225. The synchronization components 225 may be used to allow a user to designate files and folders that are to be made available offline. In operation, a user may designate certain files and folders from the data store 216 that are to be made available offline to the client 205. The term "object" may include a file or a folder. When a user designates objects that are to be made available offline to the client 205, the synchronization components 225 may copy the objects from the data store 216 (sometimes referred to as the "remote store 216") to the data store 215 (sometimes referred to as the "local store 215"), determine when the client 205 has gone offline, provide access to the objects from the local store 215 or the server store 216 depending on the connection state between the client 205 and the server 210, monitor changes to the objects while the client 205 is offline and maintain data structures accordingly, determine when the client is reconnected to the server 210, perform synchronization activities when the client is reconnected to the server 210, and perform other similar actions.

Figure 3:
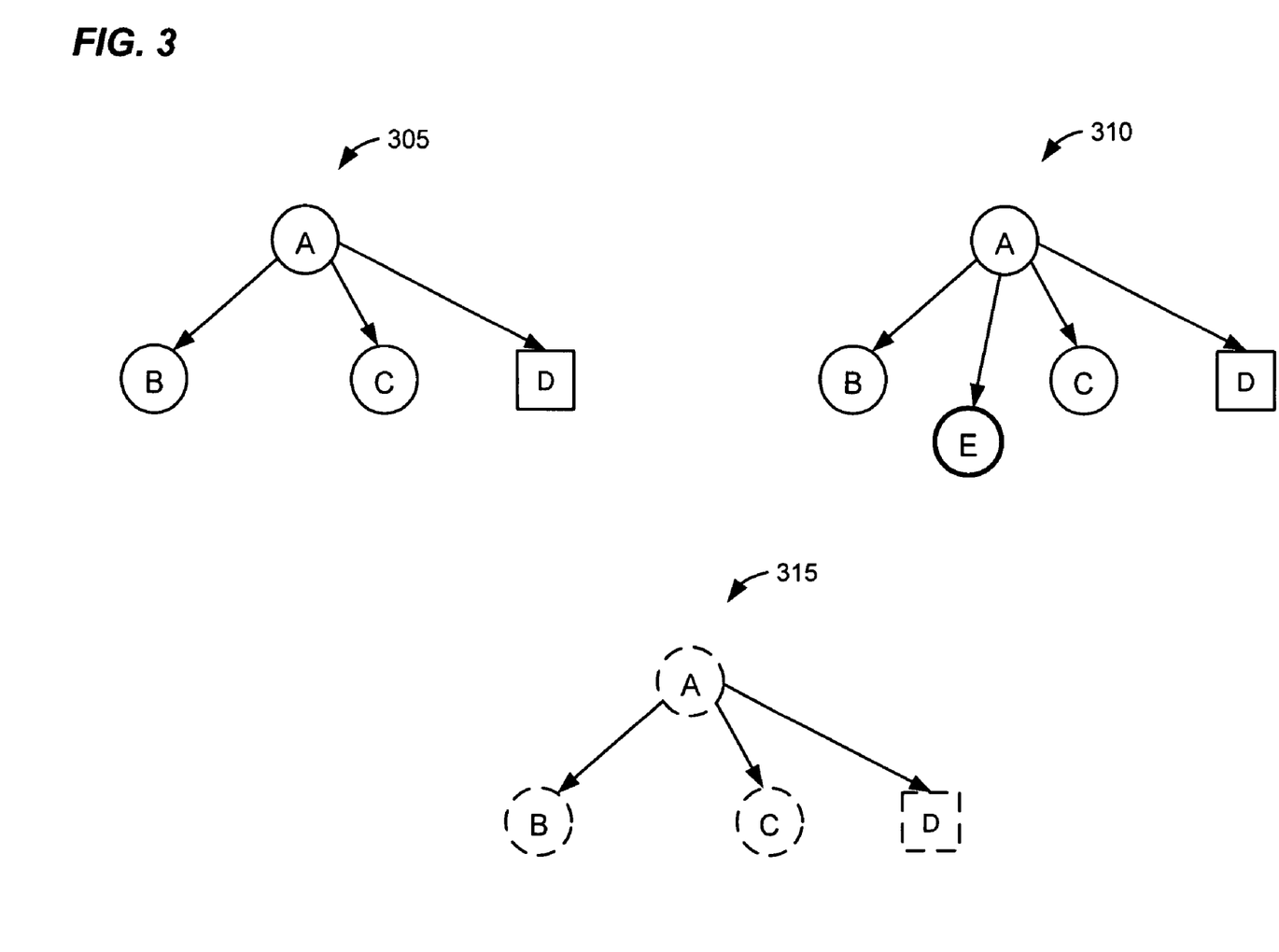
FIG. 3 is a block diagram that generally represents an exemplary data structure before and after a directory is deleted in accordance with aspects of the subject matter described herein.

FIG. 3 is a block diagram that generally represents an exemplary data structure before and after a directory is deleted in accordance with aspects of the subject matter described herein. At time 305, a client is online with a server. The user has designated that the directory A together with all of the objects that reside in the directory A or any of its descendents be available offline. At time 305, the descendants of A include the directories B and C and the file D.

At time 310, the client goes offline. During this time the user adds the directory E and deletes the file D. After that, the user deletes the directory A.

The data structure at time 315 illustrates information that is maintained regarding objects stored on the local store 215. In particular, note that there may be no need to maintain information about the directory E. The directory E was created and deleted while the client was offline. When the client synchronizes with the server there is no need to synchronize anything about the directory E because it did not exist on the server when the client went offline and it did not exist on the client when the client reconnected to the server.

The data structure at time 315 indicates that the directories A, B, and C and the file D have been deleted while the client was offline. The information maintained about each object may be sufficient to identify whether the object has changed since the client went offline. For example, the information may include one or more of a name of the object, a path to the object, a timestamp of when the object was last updated on the server before the client went offline, a hash of a portion (e.g., the data) or all (e.g., the data and metadata associated with) the information about the object just before the client went offline, and the like. For a directory a name and path of the directory (if not included in the name) may be sufficient information to identify the directory on the remote store.

When an object is deleted, a tombstone may be created for the object and tombstones may be created for the descendants of the object, if any. Each tombstone may include or be associated with the information that identifies its associated object as indicated above. A tombstone indicates that an object has been deleted on the client.

When the client synchronizes with the server after coming back online, the client attempts to find the directories A, B, and C and the file D on the server. If they exist and have not changed, the client deletes them as described in more detail below.

The directories and/or file may have changed on the remote store while the client was offline. For example, new objects may have been added to the directories or files within the directories may have changed. If an object exists and has changed since the client went offline, the client may engage in conflict resolution. This conflict resolution may performed automatically (e.g., with no user involvement), semi-automatically (e.g., partially automatically and partially with user involvement), or manually (e.g., with enhanced user involvement). Where the user is involved, conflict resolution may involve querying the user to determine whether to delete objects in view of changes made on the server after the client went offline.

Before a directory is deleted on a server, the descendants of the directory may be deleted from the leaf nodes up. For example, before the directory A is deleted, the objects B, C, and D need to be deleted. If B has any children, these children and their descendants need to be deleted before B is deleted. Likewise for C. This is to ensure that all of the children of a particular directory are deleted before the directory is deleted. Deleting in this way is helpful if an error occurs during synchronization. For example, the client may go offline, the server or client may become non-functional, the data stores may become inaccessible, and so forth. When the error is corrected and synchronization resumes, the client may resume synchronization where it left off.

During synchronization for a directory that has been deleted, a client may begin by deleting all child objects that have been marked for deletion (e.g., via tombstones) before attempting to delete the parent directory of those objects. If after all the child objects have been deleted, there still remain additional objects in the directory, the directory may not be deleted. This may occur, for example, if objects were added to the directory on the remote store while the client was offline, objects were added to or renamed in the directory while the client was offline, if, via conflict resolution, objects remain in the directory, or for other reasons.

When a directory is renamed on a local store while a client is offline, one of two different paths may be followed depending on whether the target directory (i.e., the directory to which the directory is being renamed) has been tombstoned. For example, if the directory A of FIG. 3 was renamed to G and G was not associated with a tombstone, one set of actions may be followed while if G was associated with a tombstone another set of actions may be followed.

In the simple case (where the target directory is not associated with a tombstone), renaming a directory while offline may be treated as a delete and a create operation. In the delete operation, the directory and all of its descendants are marked with tombstones to indicate that they have been deleted. In the create operation, the directory and its descendants may be created. In the create operation, before a child of a directory is created, the directory itself is created. In the delete operation, before a directory is marked for deletion, all of its descendents are marked for deletion. To preserve data in case of a system failure, the client may perform the create operation before the delete operation.

Figure 4:
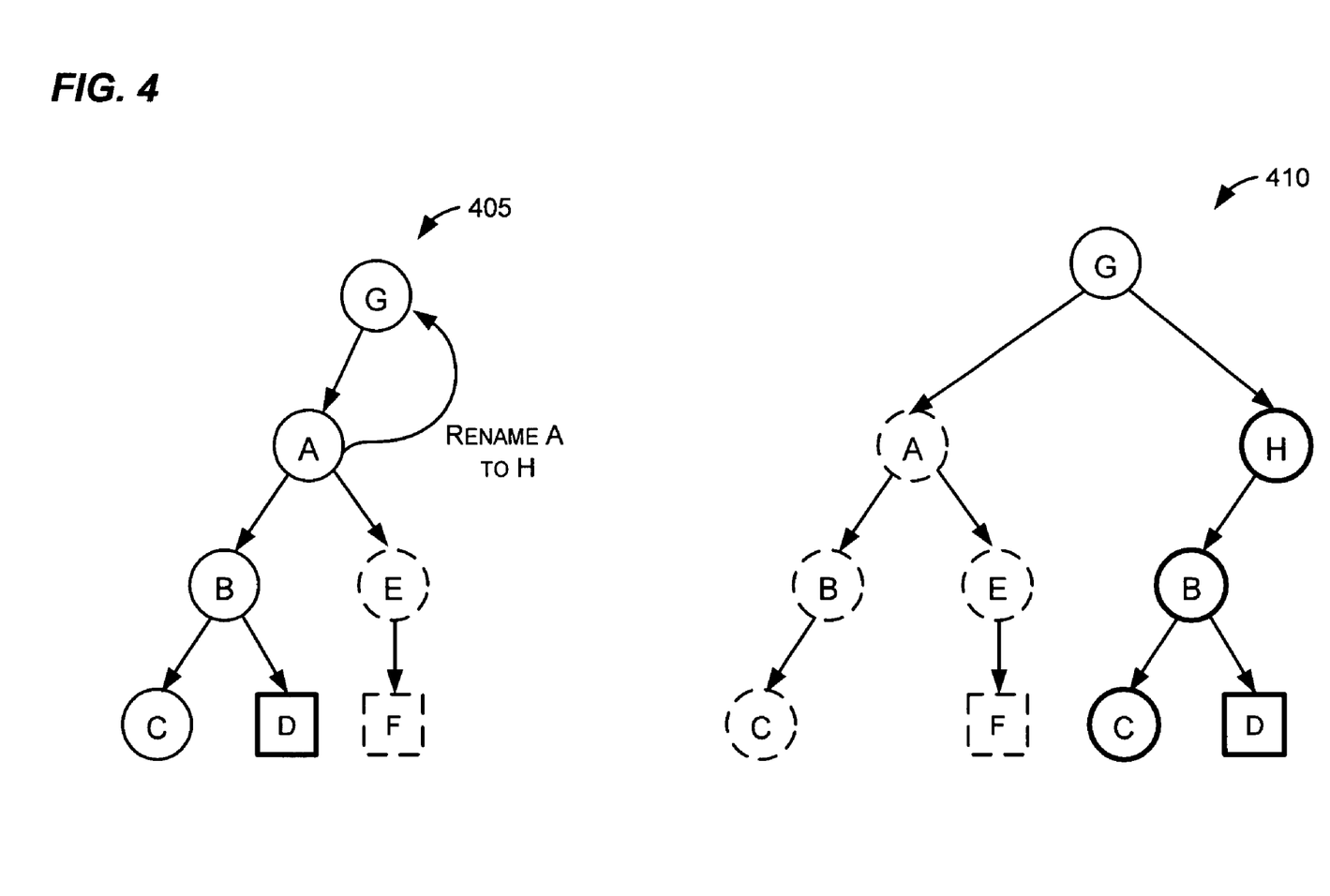
FIG. 4 is a block diagram that generally represents an exemplary data structure before and after a rename operation when the target directory of the rename has not be marked for deletion in accordance with aspects of the subject matter described herein.

FIG. 4 is a block diagram that generally represents an exemplary data structure before and after a rename operation when the target directory of the rename has not be marked for deletion in accordance with aspects of the subject matter described herein.

At time 405, in the local store, the directory G has a child A which has children B and E. B has children C and D while E has a child F. E and F have been marked for deletion which means that they existed on the remote store before the client went offline. The client receives an indication that the directory A is to be renamed to H and remain as a child of G.

To make this change the directory H with its descendants B, C, and D are created. In one embodiment, first H is created, then B is created, followed by C and D. In conjunction with H and its descendants being created, the objects A, B, and C are marked for deletion. The object D is simply deleted from the left branch of the data structure shown at time 410 as it was created after going offline.

The data structure including G and the objects in its left branch (i.e., H, B, C, and D) are what appears to a user or application viewing the local store. The directory A and its descendants appear deleted to applications and users of the client although information is still maintained that allows each object that has been deleted to be identified on the remote store.

When the data structure shown at time 410 is synchronized after going back online, H and its descendants may be created first followed by deleting A and its descendants. If a descendant of A has been modified on the remote store between the times of going offline and online, this may trigger conflict resolution. If descendants have been added to any directory between the times of going offline and online, this may cause one or more directories to not be deleted as a directory is not to be deleted unless all of its descendants have been deleted.

FIGS. 5-8 are block diagrams that generally represent exemplary data structures associated with a rename operation when the target directory of the rename has been marked for deletion in accordance with aspects of the subject matter described herein.

Figure 5:
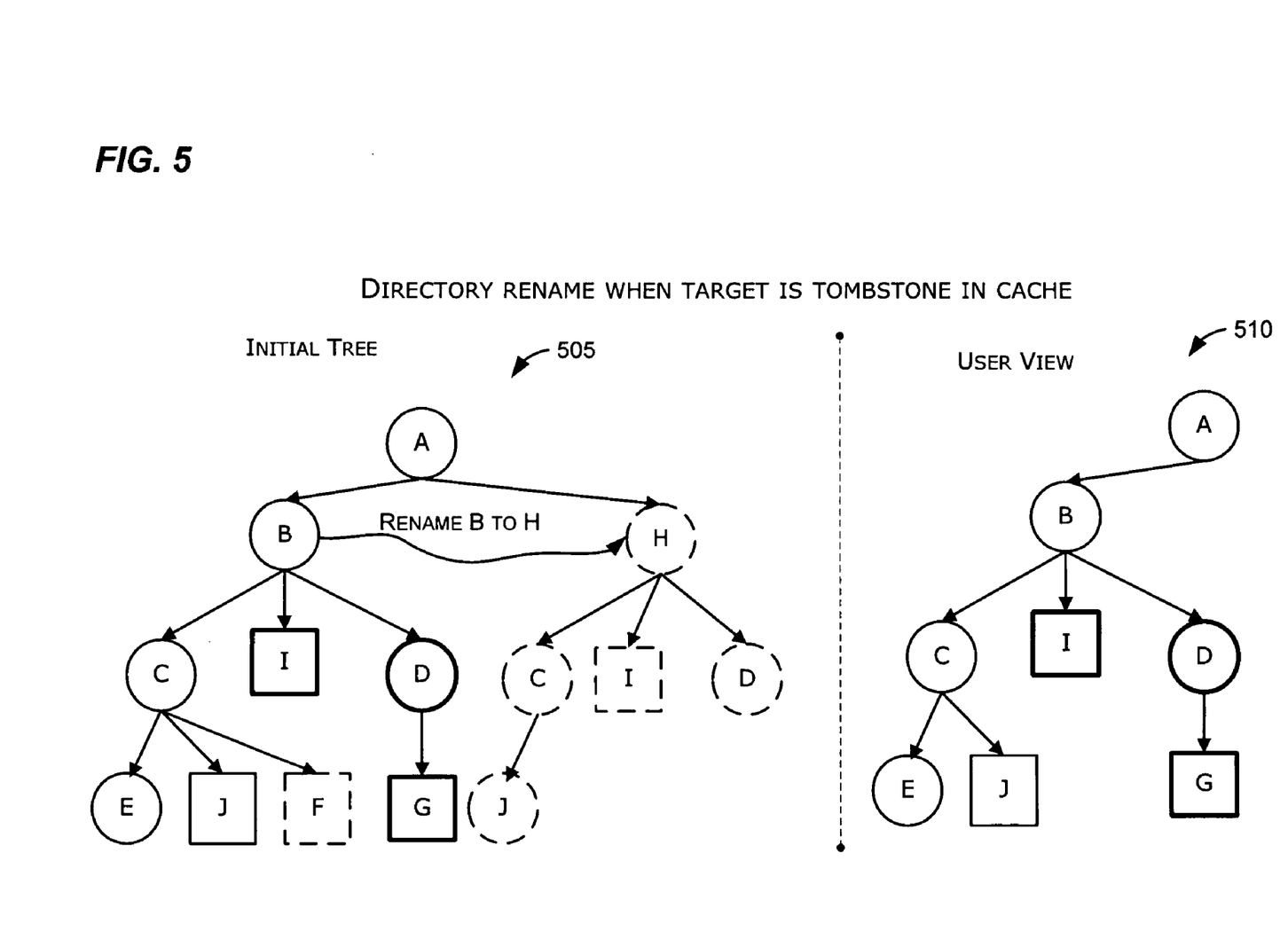
FIGS. 5-8 are block diagrams that generally represent exemplary data structures associated with a rename operation when the target directory of the rename has been marked for deletion in accordance with aspects of the subject matter described herein.

Turning to FIG. 5, at time 505, an indication that the directory B is to be renamed as the directory H and is to remain as a child of A is received. At time 505, the directory H and each of its descendants have been marked for deletion. B includes a descendant F that has been marked for deletion. The objects I, D, and G have been added to B (as indicated by the bolded outline of these nodes) after the client went offline.

View 510 illustrates what objects a user or application executing on the client would see of the directory A and its descendants.

Figure 6:
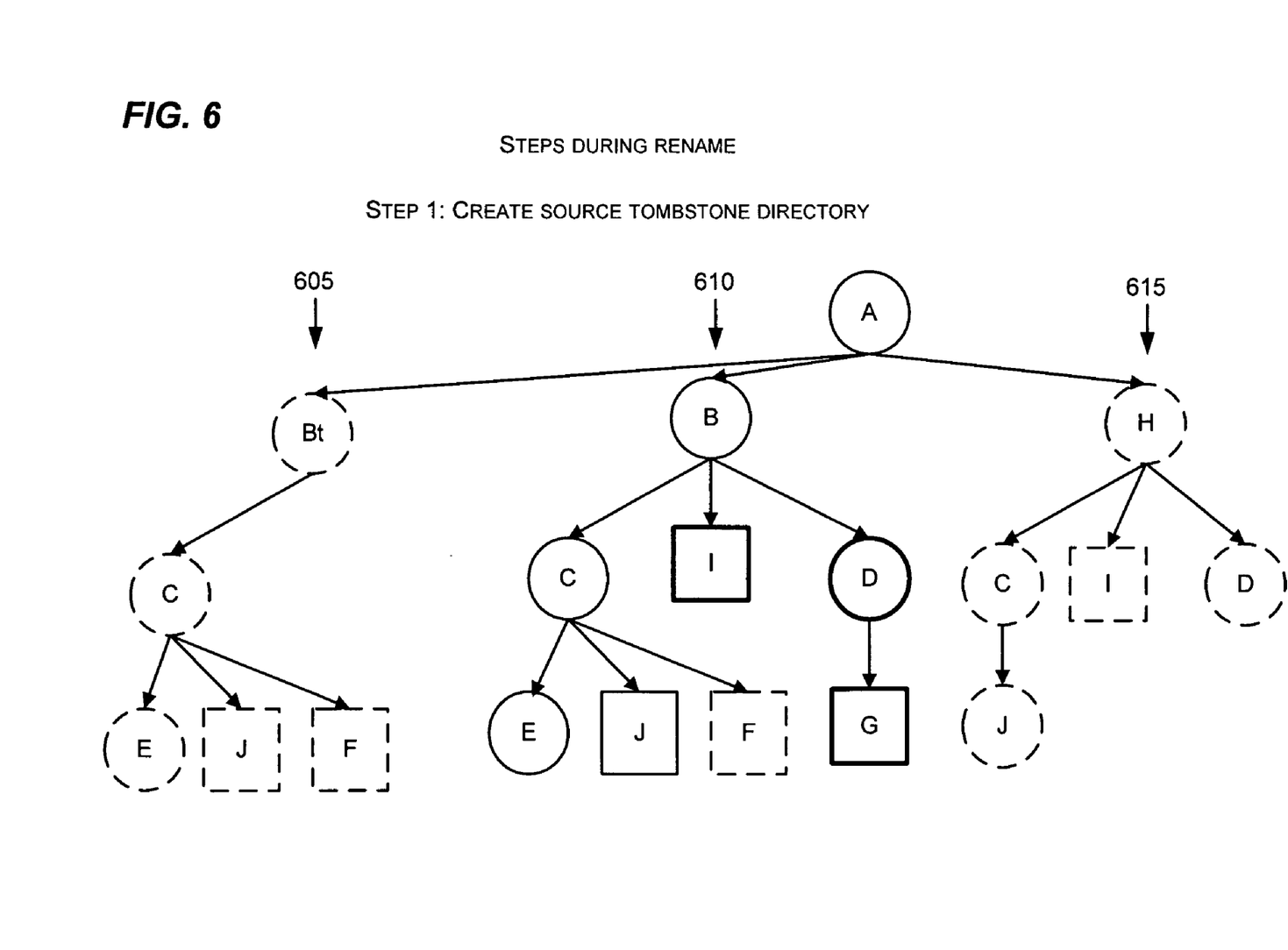

Turning to FIG. 6, first a source tombstone data structure 605 is created. The source tombstone data structure 605 includes a tombstone for each object that existed in the directory B before the client went offline. It excludes objects that were created after the directory B went offline. Note that the objects I, D, and G are not included in the source tombstone data structure 605. In one embodiment, the source tombstone data structure 605 may be created by modifying the original data structure 610 in place.

Figure 7:
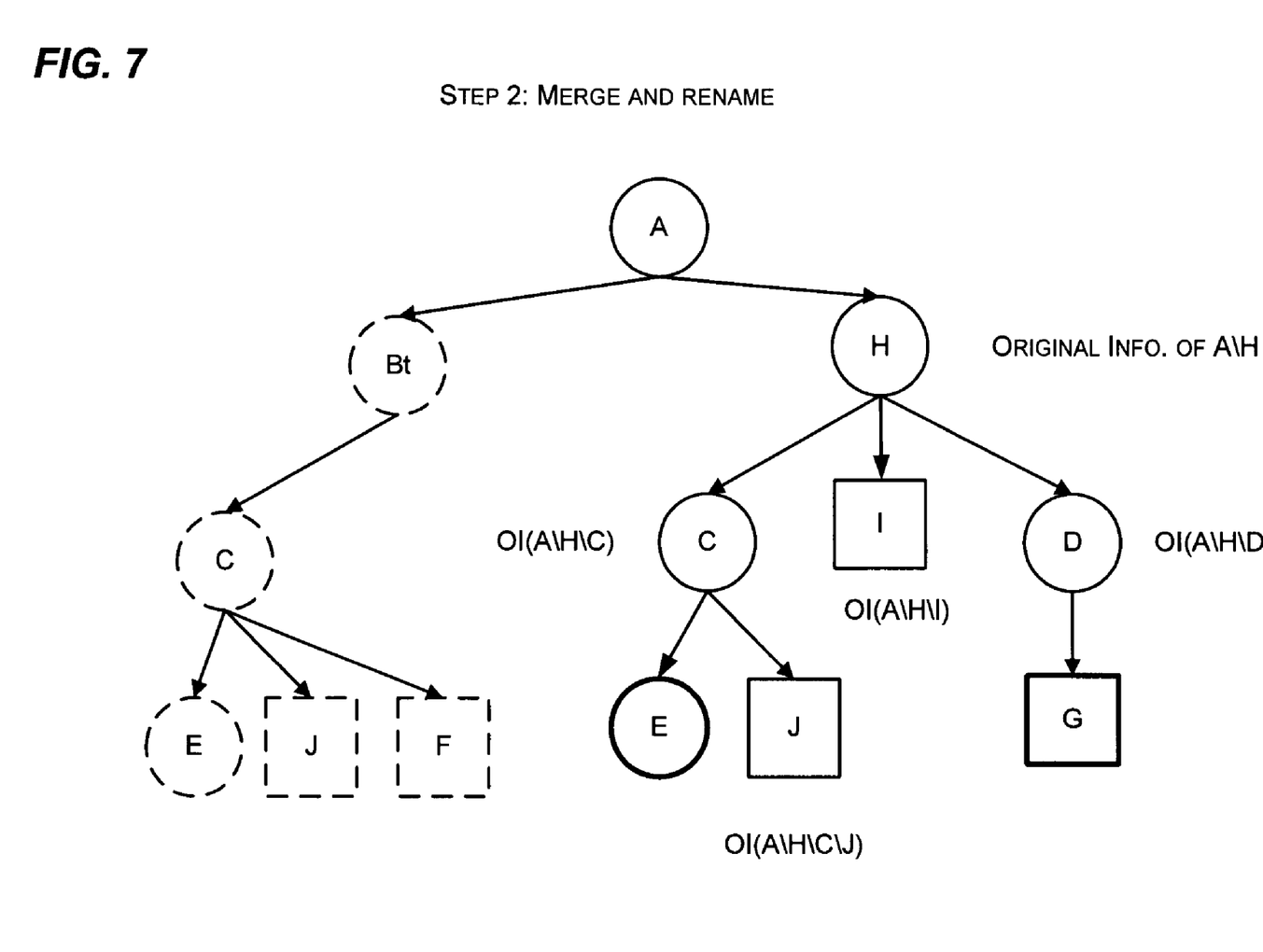

Turning to FIG. 7, the original data structure 610 has been merged with the deleted target 615. In this merge, the deleted directory H is resurrected meaning that its tombstone is removed. In addition, the original identifying information associated with H is retained. As described previously, this identifying information may include a timestamp, hash, or some other information that identifies the directory H on the remote store. This is done so that H may be correctly identified during synchronization.

The original identifying information is also maintained for other objects that have been resurrected. These objects include C, I, D, and J. For objects that are new since the client went offline, there is no need to maintain original identifying information as it is not needed to identify objects that existed just prior to going offline.

Figure 8:
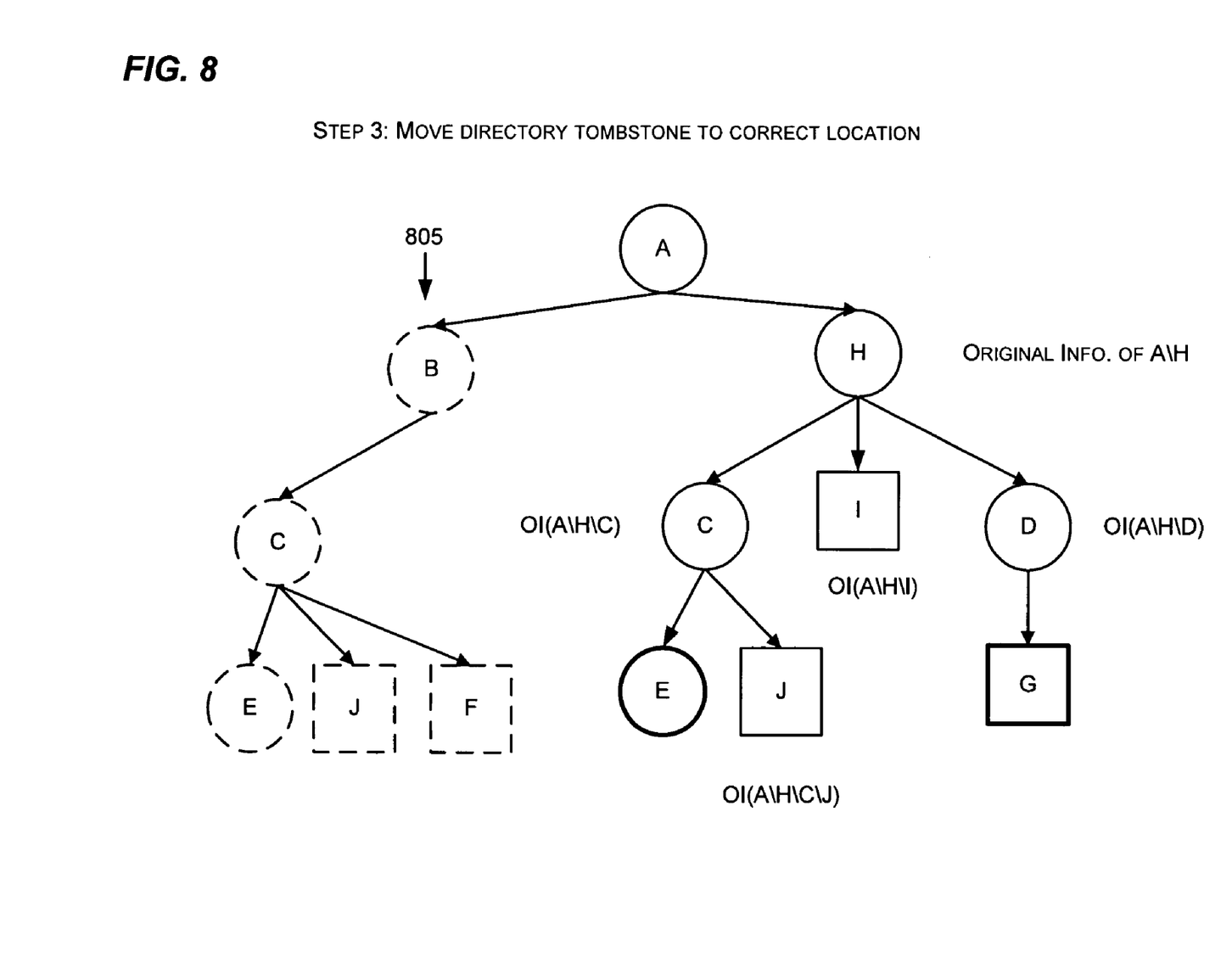

Turning to FIG. 8, the source tombstone data structure 605 of FIG. 6 is renamed to the tombstone data structure 805. This tombstone data structure may then be used to delete objects during synchronization with a server when the client goes online with the server.

Figure 9:
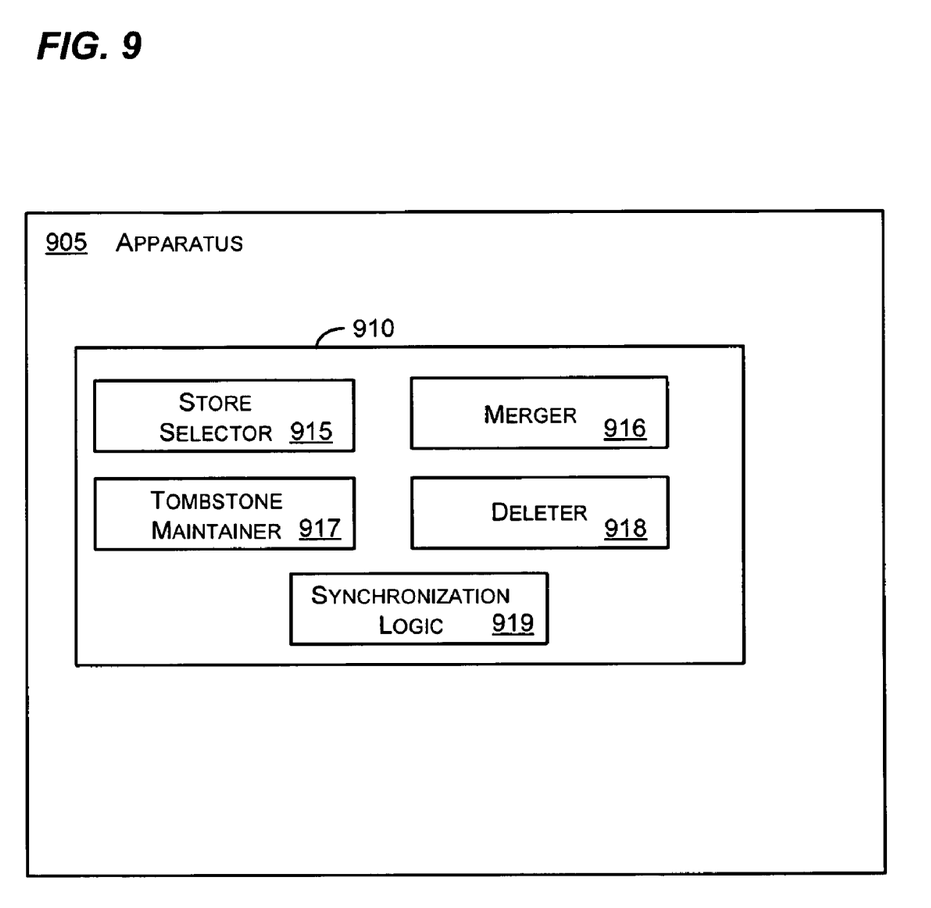
FIG. 9 is a block diagram illustrating various components that may be included in an apparatus arranged in accordance with aspects of the subject matter described herein.

FIG. 9 is a block diagram illustrating various components that may be included in an apparatus arranged in accordance with aspects of the subject matter described herein. The components illustrated in FIG. 9 are exemplary and are not meant to be all-inclusive of components that may be needed or included. In other embodiments, the components or functions described in conjunction with FIG. 9 may be included in other components or placed in subcomponents without departing from the spirit or scope of aspects of the subject matter described herein.

Turning to FIG. 9, the apparatus 905 may include synchronization components 910 which may comprise a store selector 915, a merger 916, a tombstone maintainer 917, a delete 918, and synchronization logic 919. The apparatus 905 may be implemented as a computer (e.g., the computer 110 of FIG. 1).

The store selector 915 may be operable to determine whether to access a remote or a local data store. For example, if a client has gone offline with a remote data store that includes objects that the client makes available while offline, the store selector 915 may select the local data store during this time. As another example, if the client is online with a remote data store the store selector 915 may select the remote data store during this time.

The merger 916 merges data in the case that a directory is renamed as a directory that was previously deleted while offline from the remote data store. As part of this, the merger may undelete objects that have been deleted and merge information about renamed object into the data structures associated with the undeleted object. As the steps involved in this process have been described previously, they will not be described in more detail here.

The tombstone maintainer 917 may maintain tombstone information regarding deletions that have occurred on the local store. This tombstone maintainer 917 may store this information in non-volatile storage such as a hard disk, for example. The information about each object that has been deleted on the local data store may include information identifying a corresponding object on the remote data store. The information may indicate that an object has been deleted on the local store. Other information about the steps taken during deletion have been described previously and will not be described in more detail here.

The deleter 918 may engage in deletion activities for objects stored on the local data store. The deleter 918 may be invoked in response to a user indication that a directory is to be deleted. In these deletion activities, the deleter 918 may create tombstones for each object deleted. The actions taken during deletion have been described previously and will not be described in more detail here.

The synchronization logic 919 operates to synchronize changes that occurred after going offline from the remote data store. The synchronization logic 919 does not rely on synchronization logic hosted on a server to synchronize these changes. In other words, there does not need to be logic on the server that tracks changes made to the objects on the remote data store that occurred while the client was offline from the server. Such logic may exist on the server, but is not required for the synchronization logic 919 to correctly operate.

The synchronization logic 919 may include conflict resolution logic to resolve conflicts when changes have occurred (e.g., files have been added, changed, deleted, and the like) to a directory on a remote store while the apparatus 905 has been offline from the remote store. This conflict resolution logic may perform as described previously in conjunction with FIG. 3.

Figure 10:
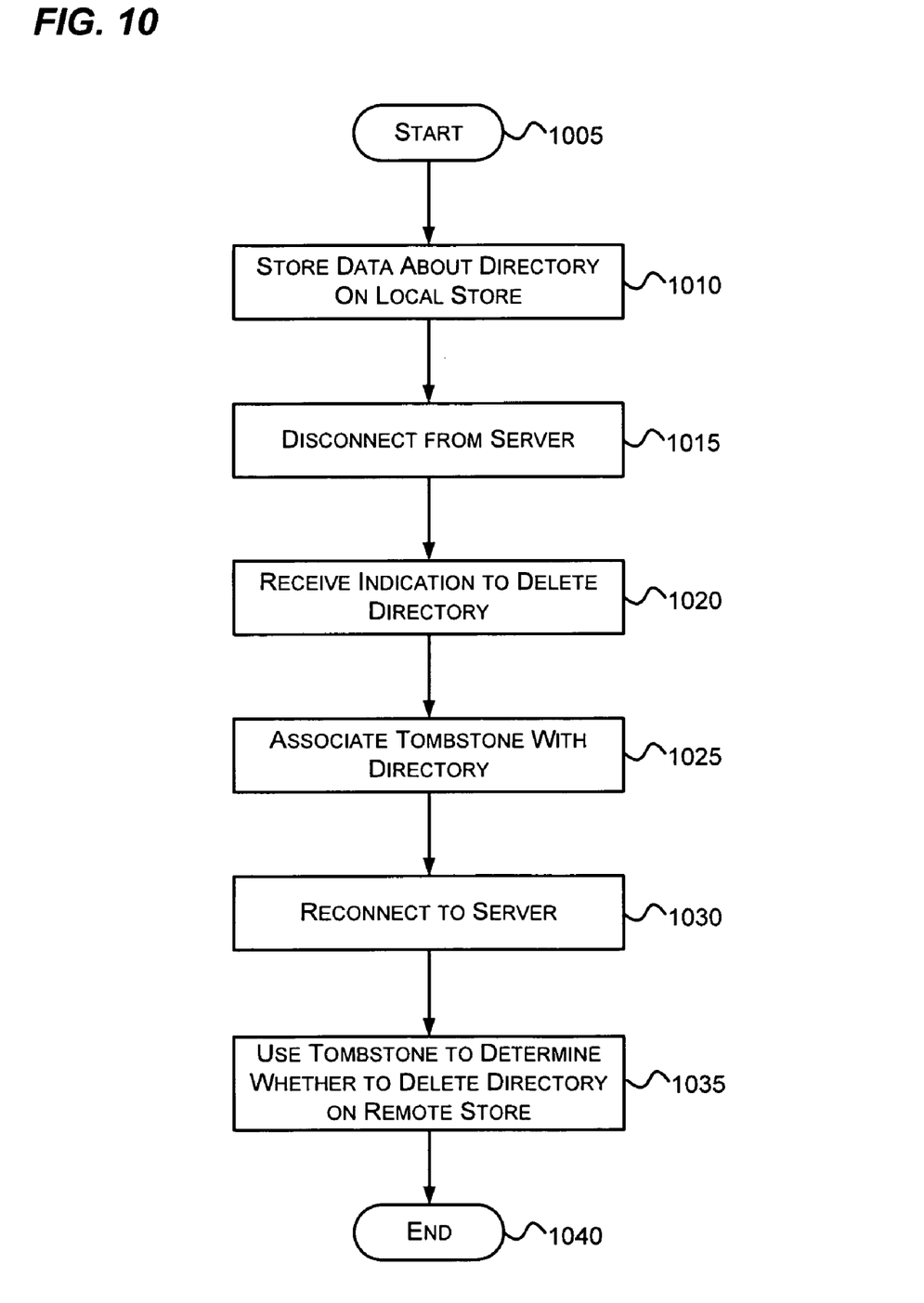
FIGS. 10-11 are flow diagrams that generally represent exemplary actions that may occur in accordance with aspects of the subject matter described herein.
Figure 11:
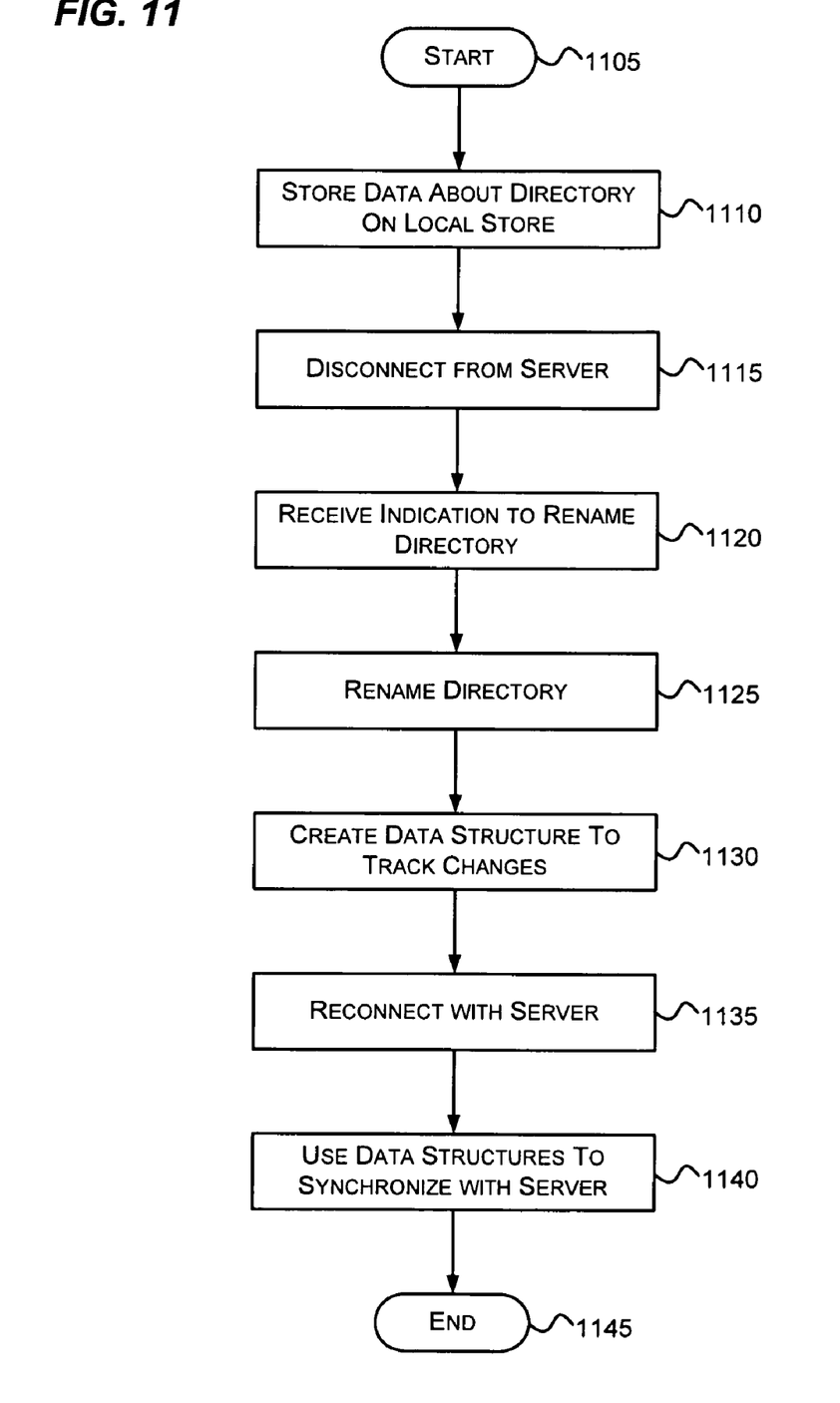

FIGS. 10-11 are flow diagrams that generally represent exemplary actions that may occur in accordance with aspects of the subject matter described herein. For simplicity of explanation, the methodology described in conjunction with FIGS. 10-11 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 10, at block 1005, the actions begin. At block 1010, data regarding a directory that is to be made available for offline use is stored on a local store. For example, referring to FIG. 2, the client 205 stores a directory of the remote store 216 on the local store 215.

At block 1015, the client goes offline from the server. For example, referring to FIG. 2, the client becomes disconnected from the server 210. Going offline may include disconnecting from any variety of reasons including logging off, disconnecting a network cable, losing a connection, computer or network failure, and the like.

At block 1020, an indication that the directory is to be deleted on the local store is received. For example, referring to FIG. 2, the client 205 receives an indication from a user that a directory that is available offline is to be deleted.

At block 1025, a tombstone is associated with the directory. As mentioned previously, tombstones may also be associated with each object that is a descendant of the directory. For example, referring to FIG. 3, the client associates a tombstone with the directory A and each of its descendants that were not added after the client went offline with the server.

At block 1030, the client goes online with the server. For example, referring to FIG. 2, the client 205 reconnects with the server 210.

At block 1035, one or more tombstones are used to determine whether to delete the directory on the remote store. For example, referring to FIG. 9, the synchronization logic 919 determines what objects to delete on the remote store 216 of FIG. 2 based at least on the tombstones. The synchronization logic 919 may also use other mechanisms include conflict resolution processes and information it obtains about files that have changed on the remote source in making this determination.

At block 1040, the actions end.

Turning to FIG. 11, at block 1105, the actions begin. At block 1110 and 1115 actions similar to those occurring at blocks 1010 and 1015, respectively, of FIG. 10 occur.

At block 1120, an indication is received that a directory is to be renamed on the local store. For example, referring to FIG. 2, the client 205 receives an indication from a user that a directory that is available offline is to be renamed.

At block 1125, the directory is renamed. For example, referring to FIG. 4, the directory A is renamed to H.

At block 1130, data structures are created to track the changes to the renamed directory. For example, referring to FIG. 4, the data structures illustrated at time 410 are created.

At block 1135, the client goes online with the server. For example, referring to FIG. 2, the client 205 reconnects with the server 210.

At block 1140, the data structures are used to synchronize with the server. For example, referring to FIG. 4, the data structure illustrated at time 410 is used to synchronize objects with the server 210.

At block 1145, the actions end.

As can be seen from the foregoing detailed description, aspects have been described related to synchronizing for directory changes performed while offline. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

storing data regarding a directory of a file system on a local store, a copy of the directory being stored on a remote store associated with a server;

becoming disconnected from the server;

receiving an indication that the directory is to be deleted on the local store;

associating a directory tombstone with the directory, the directory tombstone indicating that the directory has been deleted on the local store, the directory tombstone including information usable to identify the directory on the remote store;

associating a tombstone with each descendant of the directory indicating that the descendant has been deleted locally, the tombstone associated with a particular descendant including information usable to identify the particular descendant on the remote store;

reconnecting with the server;
using at least the directory tombstone associated with the directory in determining whether to delete the directory on the remote store; and
undeleting the directory on the local store, if an object was added to or renamed in the directory on the remote store while disconnected from the server.

2. The method of claim 1, wherein receiving an indication that the directory is to be deleted comprises receiving an indication from a user that the directory is to be deleted.

3. The method of claim 1, further comprising removing the directory from the local store such that the directory is unavailable to processes executing associated with the local store.

4. The method of claim 1, wherein the information included in the directory tombstone includes a name of the directory.

5. The method of claim 1, wherein the information comprises a timestamp of when an object was created or updated on the remote store.

6. The method of claim 1, further comprising after reconnecting with the server, for each tombstone associated with a descendant of the directory, attempting to find a corresponding descendant of the directory on the remote store, and if found and not changed, deleting the corresponding descendant on the remote store.

7. The method of claim 1, further comprising detecting a conflict when objects in the directory have been added, changed, or renamed on the remote store after becoming disconnected.

8. The method of claim 1, wherein the directory tombstone is associated with the directory by a process that is independent of all processes of the server, the method being implemented in an environment in which it is a client's responsibility to synchronize changes made to the directory while the client is offline, the client having access to the local store but not the remote store while the client is offline.

9. A computer storage medium having computer-executable instructions, which when executed perform actions, comprising:
    storing data regarding a first directory of a file system on a local store, a copy of the first directory being stored on a remote store associated with a server, the first directory having a first name;
    going offline from the server;
    receiving an indication that the first directory is to be renamed to a second directory on the local store, the second directory having a second name;
    renaming the first directory on the local store to the second directory;
    creating a data structure that indicates that the first directory and its descendants are deleted locally;
    going online with the server; and
    updating the remote store with rename changes associated with the first and second directories, comprising:
        adding a third directory on the remote store;
        copying the descendants of the second directory from the local store to the third directory on the remote store; and
        after the descendants have been copied, deleting, from the remote store, all descendants that were deleted locally that exist in the remote store and have not changed after going offline from the server;
        determining that no changes have occurred to descendants of the first directory on the remote store after going offline from the server; and
        renaming the first directory on the remote store to the third directory on the remote store, the third directory having the second name.

10. The computer storage medium of claim 9, further comprising deleting, from the remote store, the first directory if the first directory on the remote store has no remaining descendants.

11. The computer storage medium of claim 9, further comprising:
    determining that the second directory has been marked as deleted;
    marking the second directory as not deleted; and
    merging descendants of the first directory into the second directory.

12. The computer storage medium of claim 11, wherein merging descendants of the first directory into the second directory comprises maintaining information for each descendant that also existed in the remote store before going offline, the information indentifying a corresponding object that existed on the remote store before going offline.

13. The computer storage medium of claim 11, wherein merging descendants of the first directory into the second directory comprises deleting information for each descendant of the first directory that was created after going offline.

14. The computer storage medium of claim 9, wherein going offline from the server comprises being disconnected from the server and wherein going online with the server comprises reconnecting to the server.

15. In a computing environment, an apparatus, comprising:
    a computing device comprising:
        a store selector operable to determine whether to access a local data store or a remote data store;
        a deleter operable to engage in deletion activities for objects stored on the local data store, the deletion activities comprising associating a tombstone with the object, the tombstone including information to identify a corresponding object on the remote store that existed before going offline with the remote store, the deleter further operable to, when the object is deleted, determine whether the object has one or more descendants, and, if the object has one or more descendants, to create tombstones for the one or more descendants of the object;
        a tombstone maintainer operable to maintain information about objects that have been deleted on the local store, the information identifying corresponding objects on the remote data store that existed before going offline from the remote data store, the information indicating that the objects have been deleted on the local store;
        a merger operable to undelete objects that have been deleted on the local store and to merge information about renamed objects into data structures associated with the undeleted objects; and
        synchronization logic operable to synchronize changes that occurred after going offline from the remote data store using at least the one or more tombstones, the synchronization logic not relying on synchronization logic hosted on a server associated with the remote data store to synchronize the changes.

16. The apparatus of claim 15, wherein in merging information about renamed objects into data structures associated with the objects, the merger retains information that identifies a corresponding object on the remote store of an object that is undeleted on the local store.

* * * * *